United States Patent [19]
Hodge

[11] Patent Number: 5,690,719
[45] Date of Patent: Nov. 25, 1997

[54] REMOVABLE FILTER FOR A FORCED AIR DUCT GRILL

[76] Inventor: Joseph Hodge, P.O. Box 652, Owensville, Ohio 45160

[21] Appl. No.: 545,234

[22] Filed: Oct. 19, 1995

[51] Int. Cl.⁶ .................. B03C 3/30; B01D 46/10
[52] U.S. Cl. .................. 96/17; 55/486; 55/495; 55/504; 55/524; 55/DIG. 35; 55/DIG. 39; 96/134; 454/246; 454/283; 454/287
[58] Field of Search .................. 55/467, 493, 495, 55/486, 524, 482, DIG. 31, DIG. 39, DIG. 35, 279, 511; 95/273; 96/17, 134; 454/245, 246, 247, 283, 284, 287, 289

[56] References Cited

U.S. PATENT DOCUMENTS

| | | | |
|---|---|---|---|
| 637,519 | 11/1899 | Mertins | 454/289 |
| 943,298 | 12/1909 | Brown | 55/DIG. 35 |
| 1,385,502 | 7/1921 | Smith et al. | 454/284 |
| 1,429,811 | 9/1922 | Tynan | 55/481 |
| 1,694,089 | 12/1928 | Wright | 261/164 |
| 1,726,792 | 9/1929 | Altman et al. | 55/481 |
| 1,737,532 | 11/1929 | Allen | 96/152 |
| 1,739,372 | 12/1929 | Pirchio | 454/289 |
| 1,854,569 | 4/1932 | Welch | 55/227 |
| 1,886,460 | 11/1932 | Anderson | 55/496 |
| 2,050,605 | 8/1936 | Gordon et al. | 55/493 |
| 2,493,257 | 1/1950 | Malme | 55/267 |
| 2,557,279 | 6/1951 | Greenberg | 55/515 |
| 2,575,499 | 11/1951 | Manow | 55/422 |
| 2,595,833 | 5/1952 | Flaherty | 160/369 |
| 2,754,747 | 7/1956 | Bertling | 454/309 |
| 2,825,500 | 3/1958 | McLean | 55/470 |
| 2,959,832 | 11/1960 | Baermann | 24/303 |
| 2,999,275 | 9/1961 | Blume, Jr. | 156/243 |
| 3,003,581 | 10/1961 | Greason | 55/514 |
| 3,019,127 | 1/1962 | Czerwonka et al. | 428/336 |
| 3,040,501 | 6/1962 | Pietsch | 55/500 |
| 3,046,719 | 7/1962 | Tropiano | 55/417 |
| 3,124,725 | 3/1964 | Leguillon | 335/303 |
| 3,136,720 | 6/1964 | Baermann | 210/222 |
| 3,159,983 | 12/1964 | Metcalfe | 62/262 |
| 3,187,662 | 6/1965 | Kreuttner | 454/265 |
| 3,203,338 | 8/1965 | Dry | 454/318 |
| 3,225,679 | 12/1965 | Meyer | 454/289 |
| 3,358,578 | 12/1967 | Meyer | 454/307 |
| 3,382,985 | 5/1968 | Muehl | 210/495 |
| 3,388,535 | 6/1968 | Nash | 55/524 |
| 3,458,130 | 7/1969 | Juhlin | 237/53 |
| 3,494,113 | 2/1970 | Kinney | 55/481 |
| 3,679,505 | 7/1972 | Hinderaker et al. | 156/71 |
| 3,768,235 | 10/1973 | Meyer et al. | 55/385.3 |
| 3,823,926 | 7/1974 | Bracich | 261/106 |
| 3,831,765 | 8/1974 | Flynn et al. | 210/484 |
| 3,905,787 | 9/1975 | Roth | 55/488 |
| 3,912,473 | 10/1975 | Wilkins | 55/501 |
| 3,941,034 | 3/1976 | Helwig et al. | 454/146 |
| 3,999,969 | 12/1976 | Shuler | 55/418 |
| 4,047,914 | 9/1977 | Hansen et al. | 55/488 |
| 4,065,262 | 12/1977 | Petroff | 422/123 |
| 4,175,936 | 11/1979 | Lough et al. | 55/385.2 |

(List continued on next page.)

*Primary Examiner*—Duane S. Smith
*Attorney, Agent, or Firm*—Steven J. Rosen

[57] ABSTRACT

A filter apparatus for mounting over an opening at an end of a forced air system duct has a filter frame with sidewalls between open front and back ends and a channel which opens inwardly of the sidewalls. At the front end is a sheet of preferably self charging electrostatic washable filter material behind a grill, both of which are peripherally disposed within the channel and are sized and sufficiently flexible so as to be removably insertable into the channel. A second sheet of a second filter material, preferably including activated charcoal, may be disposed in the channel behind the first sheet of filter material. The filter material may be made of a woven polypropylene and the sheet may have heat sealed finished edges. A wall mount having a support frame for mounting on a wall around the opening which extends through the wall is sized and operable to support the filter frame. The support frame may be mounted to a wall. A securing lock may be used to lock the filter frame in place within the support frame and may have a pin slideably and tightly disposed through aligned apertures in the filter and support frames.

19 Claims, 3 Drawing Sheets

U.S. PATENT DOCUMENTS

| | | | |
|---|---|---|---|
| 4,334,899 | 6/1982 | McConnell | 55/321 |
| 4,470,834 | 9/1984 | Fasanaro et al. | 55/501 |
| 4,504,290 | 3/1985 | Pontius | 55/486 |
| 4,518,402 | 5/1985 | Dargel | 55/DIG. 31 |
| 4,724,749 | 2/1988 | Hedrick | 454/187 |
| 4,762,053 | 8/1988 | Wolfert | 55/493 |
| 4,961,849 | 10/1990 | Hull et al. | 210/69 |
| 5,100,445 | 3/1992 | Johnson et al. | 55/504 |
| 5,107,580 | 4/1992 | Watanabe | 29/525.01 |
| 5,176,570 | 1/1993 | Liedl | 454/309 |
| 5,240,487 | 8/1993 | Kung | 55/486 |
| 5,240,653 | 8/1993 | Ramkissoon | 261/99 |
| 5,249,765 | 10/1993 | Garcia | 248/475.1 |
| 5,266,091 | 11/1993 | McDonald | 55/495 |
| 5,421,862 | 6/1995 | Davis | 55/491 |
| 5,472,380 | 12/1995 | Sarazen, Jr. et al. | 55/493 |
| 5,525,145 | 6/1996 | Hodge | 55/495 |

REMOVABLE FILTER FOR A FORCED AIR DUCT GRILL

BACKGROUND OF THE INVENTION

1. Field of the Invention

This invention relates generally to forced air heating and air conditioning systems and, more particularly, to a removable filter apparatus which fits over and covers an opening of an air return or supply duct end of such a system.

2. Description of Related Art

Conventional forced air heating and air conditioning systems provide filtering apparatus at one location proximate the air handler or air circulating fan of the system. The area of the filter material is limited by the cross sectional area of the duct that the filter is disposed in. Usually, a large sheet of filter material is used that is either disposable or washable, the latter requiring a hosing down and, being generally difficult to wash, because of its size. A need exists for a removable filter device that is easily accessible and that can be mounted over an opening of an air return or supply duct end of a forced air heating and/or air conditioning system. It should be easy to clean and provide a greater filter surface area than conventional furnace mounted filters. The filter device should allow for maximum airflow through the filtering element, particularly, for electrostatic self charging filter materials to permit proper operation and maximum filtering efficiency. The filter device should be easily mounted and dismounted, not unattractive to look at and, unobtrusive. The filter device should be easily used with existing duct work presently found in the construction industry so as to avoid costly manufacturing and start-up costs.

The prior art clearly makes obvious a need for a filtering device to increase filtering effects of the heating and air conditioning system by adding to the normal single furnace or air conditioning filter which only filters upon introduction of air to the used area. By filtering return air, the unit accommodating the air movement receives the air in a cleaner condition, which is beneficial to the operating unit and, probably, most commonly is the ease of filter change. Additional filtering of the supply duct air through registers is also beneficial for further filtering air being supplied to living space in a building such as the room of a house.

Prior patented art found by the applicant includes the following listed U.S. Patent Nos.: Schroeder, U.S. Pat. No. 4,713,799, Dec. 15, 1987; Tynan, U.S. Pat. No. 1,429,811, Sep. 19, 1922; Tropicana, U.S. Pat. No. 3,046,719, Jul. 31, 1962; Wright, U.S. Pat. No. 1,694,089, Dec. 4, 1928; Anderson, U.S. Pat. No. 1,886,460, Nov. 8, 1932; Kung, U.S. Pat. No. 5,240,487, Aug. 31, 1993; Liedl, U.S. Pat. No. 5,176,570, Jan. 5, 1993; and Mull, U.S. Pat. No. 4,961,849, Oct. 9, 1990.

The Anderson and Wright patents are directed to registers which require total removal of the register for filter access and, thus, do not provide easy removal and replacement or washing of the filter element. The Tynan and Liedl references disclose register attachments that integral with the register and may not easily be attached without modifying the register and or the duct system. The Schroeder and Kung patents provide filters that are inserted into and disposed transversely of the duct outlet behind the grill and, thus, also do not provide easy removal, replacement or washing of the filter element. The Hull patent is directed to filter material framed by a magnetically impregnated material and designed to be placed over metallic surfaces. However, such a design has several drawbacks such as not providing a rigid support to hold the filter material flat, particularly, after being washed. This problem is a particularly acute problem for wall mounted filters over an opening of an air return or supply duct end of a forced air heating and/or air conditioning system that is large and for which the filter element required is correspondingly large. Typically, such duct ends do not provide sufficient metallic surface for the frame of Hull to be attached. The Hull design is also not particularly suitable for use in a room because the uncovered filter material is not aesthetically pleasing.

OBJECTS OF THE INVENTION

It is, accordingly, an object of the present invention to provide a filter that can be easily placed over and removably secured over wall openings of air returns and supply duct ends of forced air heating and air conditioning systems. Particularly, so that the device's filtering element may be easily washed or replaced.

It is another object to provide a filter that permits the maximum airflow through the filtering element as allowed by the opening and minimizes airflow losses through the filter device. This is particularly important as it applies to the use of self charging electrostatic filter material that relies on moving air in the system to charge the filter material.

It is a further object of the invention to provide a filter that, besides being easily mounted and dismounted, is not unattractive to look at and is unobtrusive.

A further object of the invention to provide a filter device that can be easily used with existing duct end openings presently found in the construction industry so as to avoid costly manufacturing and start-up costs.

Additional objects and advantages will be apparent to one skilled in the art and still other advantages and objects will become apparent hereinafter.

SUMMARY OF THE INVENTION

A filter apparatus for mounting over an opening at an end of a duct of a forced air system. The filter apparatus includes a filter frame having sidewalls between an open front end and an open back end. The filter frame has a channel with channel wall elements extending generally perpendicular to and inwardly of the sidewalls and such that the channel opens inwardly of the sidewalls. At the front of the filter frame is a sheet of filter material behind a grill, both of which are peripherally disposed within the channel. The filter material is preferably a self charging electrostatic washable material and the grill and sheet of filter material are sized and sufficiently flexible so as to be removably insertable into the channel. A second sheet of a second filter material may be disposed in the channel behind the first sheet of filter material wherein the second filter material preferably includes activated charcoal. The filter material may be made of a woven polypropylene and the sheet may have heat sealed finished edges such that the filter material can support its own weight within the filter frame.

An alternate embodiment includes a wall mount having a support frame for mounting on a wall around the opening which extends through the wall wherein the support frame is sized and operable to support the filter frame. The wall mount may also have a screw attachment means including screws disposed through apertures in the support frame and screwed into the wall. The opening may be a return at an end of a return duct disposed between two studs of the wall wherein the screws are screwed into the studs. The wall mount may further include a securing lock to lock the filter frame in place within the support frame. The securing lock may have a pin slideably and tightly disposed though aligned apertures in the filter and support frames. Instead of the pin being tightly disposed though the aligned apertures, it may be secured by a retaining spring within the apertures such that the pin is spring loaded within the apertures.

The foregoing, and other features and advantages of the present invention, will become more apparent in the light of the following description and accompanying drawings.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
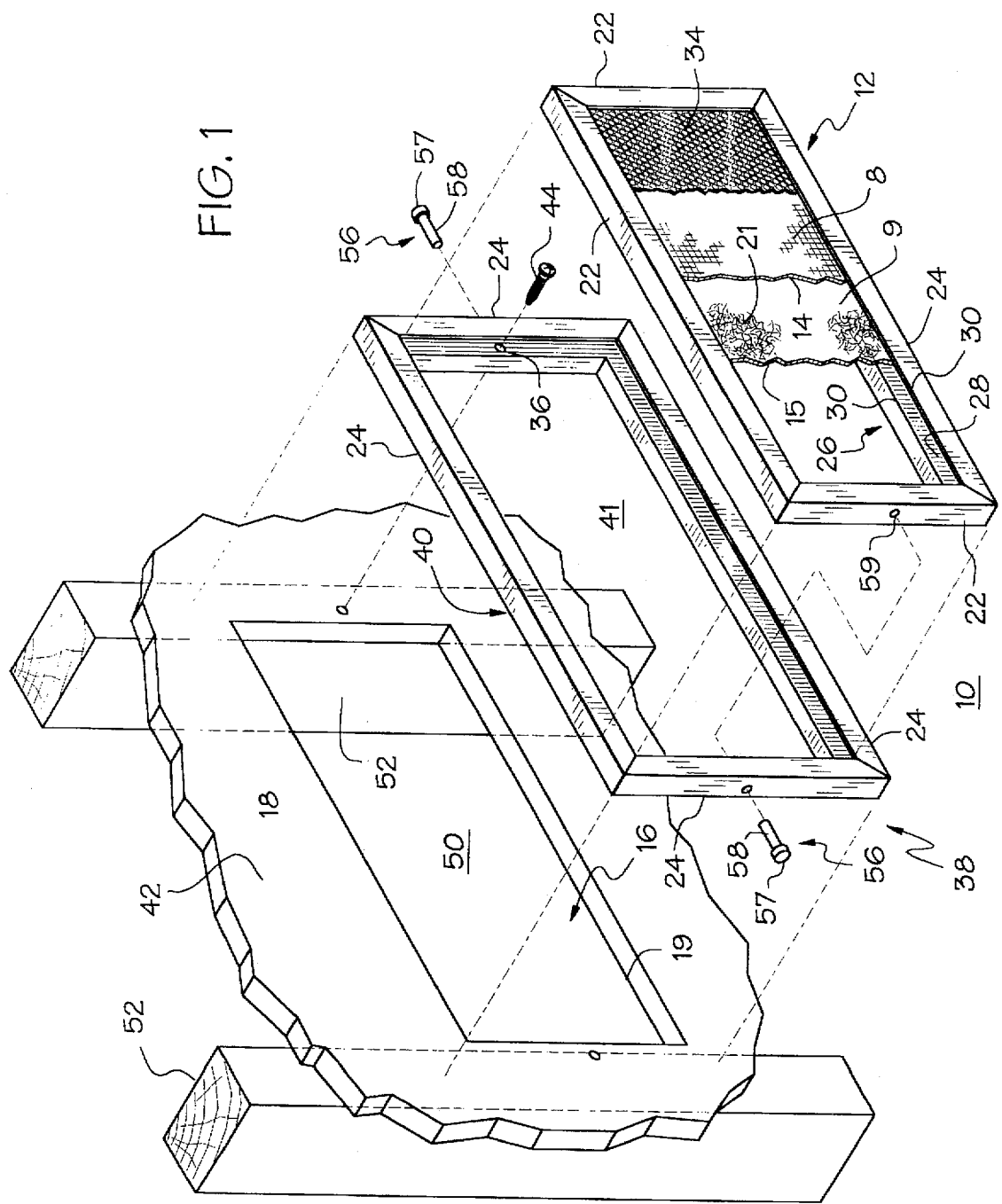
FIG. 1 is an exploded perspective view of a filter in accordance with an exemplary embodiment of the present invention.
Figure 2:
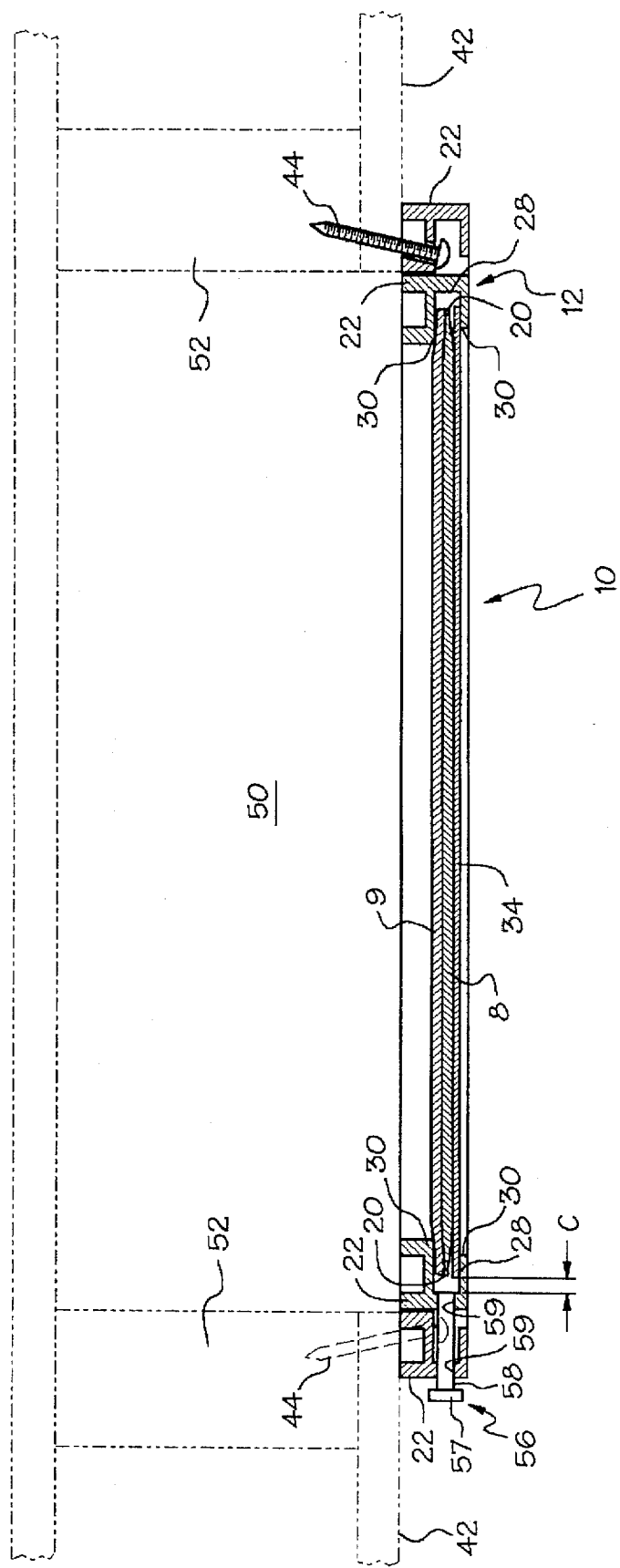
FIG. 2 is a cross sectional view taken through 2—2 of the filter in FIG. 1.

Illustrated in FIG. 1 is a filter apparatus 10 including a filter frame 12 which contains and supports a first sheet 8 of a preferably self charging electrostatic filter material 14 to filter circulating air directly in front of an opening 16 at a room end 18 of a cold air return (or supply) duct 19 of a forced air system for a heating and/or air conditioning system. The filter frame 12 has four sidewalls 22 between and defining an open front end 24 and an open back end 26. The filter frame 12 includes a channel 28 bounded by channel wall elements 30 extending generally perpendicular to and inwardly of the sidewalls 22 such that the channel opens inwardly at the front end 24 of the filter frame 12 is disposed the first sheet 8 of filter material 14 behind a grill 34 wherein both the first sheet and the grill are peripherally disposed within the channel 28 as might be more completely seen in FIG. 2. A second sheet 9 of a second filter material 15 may also be disposed in the channel 28 behind the first sheet 8 of the first filter material 14 wherein the second filter material preferably includes activated charcoal 21 for further air filtration, air purification, and odor removal.

The filter material 14 is preferably a self charging electrostatic washable material and the grill 34 and the first sheet 8 of filter material are sized and are sufficiently flexible so as to be removably insertable into the channel 28. The function of the grill 34, the first sheet 8, and the second sheet 9 (if used) being easily removed and inserted into the channel 28 is accomplished in the exemplary embodiment illustrated in the FIGS. by constructing and sizing the grill and the first and second sheets to have a clearance C with the sidewalls 22 all around the filter frame 12. The grill 34 may be made of plastic or metal. If made of metal it may be sized a bit smaller than if made of plastic so as to allow placement by positioning at different angles to slide the grill 34 into the channel 28 of the filter frame.

Different types of filter material 14 are commercially available and is preferably made of a self charging electrostatic filter material that is cleanable by a simple washing and may be ordered in a specified size. Such a filter material 14 may be made of a woven polypropylene and the first sheet 8 is preferably formed with reinforced edges 20 such that the first sheet of the filter material can support its own weight within and outside of the filter frame 12. The reinforced edges 20 provide the first sheet with additional structural rigidity so that is can be more easily slid into the channel 28. In the case of the filter material 14 being made of woven polypropylene and the reinforced edges 20 may be heat sealed edges to provide the reinforcement.

A wall mount 38 has a support frame 40 for mounting the filter frame 12 on a wall 42 around the opening 16 which extends through the wall. The support frame 40 is sized and operable to support the filter frame 12. Preferably the support frame 40 is sized and operable to hold the filter frame 12 within its interior 41 with an interference fit which snugs the filter frame 12 within the support frame 40. The wall mount 38 may also have securing and attaching apparatus such as, but not limited to, screws 44 disposed through apertures 36 in the support frame 40 and screwed into the wall 42. Other attachment apparatus includes a layer of glue or other adhesive or mechanical attachment devices. The opening 16 may be a return at an end of a return duct 50 disposed between two studs 52 of the wall 42 and the screws 44 are screwed into the studs.

The wall mount 38 may further include a securing lock 56 to lock the filter frame 12 in place within the support frame 40 which may be used in addition to an interference fit between the two frames. The securing lock 56 may have a pin 58 slideably and tightly disposed though aligned apertures 59 in the sidewalls 22 of the filter and support frames 12 and 40, respectively. The pin 58 has an optional head 57 for grabbing the pin and thus facilitating its removal. One securing lock 56 and pin 58 maybe used on each side of the filter and support frames 12 and 40, respectively.

Figure 3:
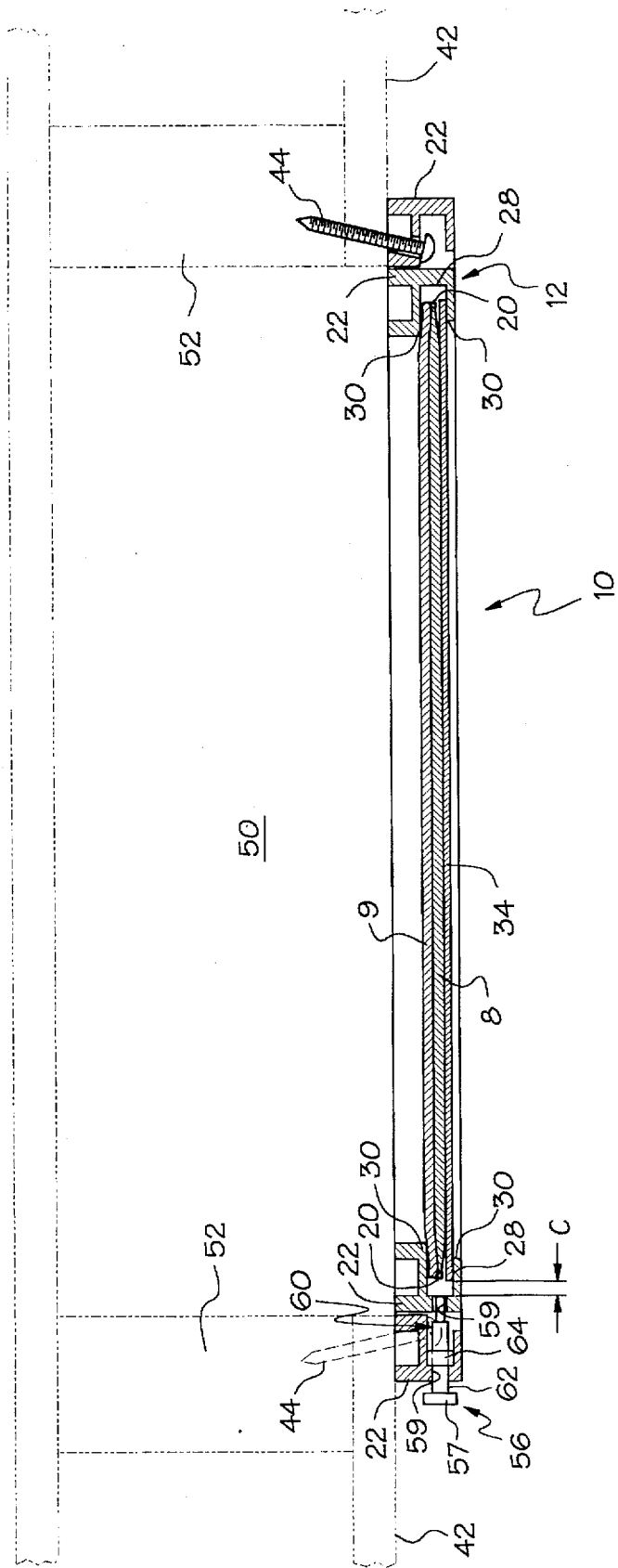
FIG. 3 is a cross sectional view of an alternative embodiment of the locking pin illustrated in FIG. 1.

Illustrated in FIG. 3 is an alternate embodiment of the securing lock 56 having a spring loaded pin apparatus 60 with the pin 58 spring loaded within a barrel 62 that is secured in one of the aligned apertures 59 in the sidewall 22 of the support frame 40 by a flat sided or other suitable type of nut 64. The pin 58 is drawn back by the head 57 such that the pin may be inserted and removed from the other one of the aligned apertures 59 in the sidewall 22 of the filter frame 12. Both of these securing locks provides an added degree of safety for retaining the filter frame 12 in place within the support frame 40.

While the preferred embodiment of the invention has been described fully in order to explain its principles, it is understood that various modifications or alterations may be made to the preferred embodiment without departing from the scope of the invention as set forth in the appended claims.

I claim:

1. A filter apparatus for mounting over an opening at an end of a duct of a forced air system, said filter apparatus comprising:

a filter frame having sidewalls between an open front end and an open back end, said filter frame having a channel with channel wall elements extending generally perpendicular to and inwardly of said sidewalls such that said channel opens inwardly of said sidewalls, a sheet of filter material behind a grill, both of which are peripherally disposed within said channel, wherein said filter material is a self charging electrostatic washable material, and a wall mount means for mounting said filter frame on a wall over an opening.

2. The filter apparatus of claim 1, wherein said grill and sheet of filter material are sized and sufficiently flexible so as to be removably insertable into said channel.

3. The filter apparatus of claim 2, further comprising a second sheet of a second filter material disposed in said channel behind said first sheet of filter material.

4. The filter apparatus of claim 3, wherein said second filter material includes activated charcoal.

5. The filter apparatus of claim 2 wherein said filter material comprises a woven polypropylene and said sheet has heat sealed finished edges such that said filter material can support its own weight within said filter frame.

6. The filter apparatus of claim 5, further comprising a second sheet of filter material disposed in said channel behind said first sheet of filter material and said sheet of a second filter material includes activated charcoal.

7. The filter apparatus of claim 1 further comprising a wall mount having a support frame for mounting on a wall around the opening which extends through said wall, wherein said support frame is sized and operable to support said filter frame.

8. The filter apparatus of claim 7 wherein said wall mount further comprises a screw attachment apparatus including screws disposed through apertures in said support frame and screwed into said wall.

9. The filter apparatus of claim 8 wherein the opening is a return at an end of a return duct disposed between two studs of said wall and said screws are screwed into said studs.

10. The filter apparatus of claim 7 wherein said wall mount further comprises a securing lock to lock said filter frame in place within said support frame.

11. The filter apparatus of claim 10 wherein said securing lock comprises a pin slideably and tightly disposed through aligned apertures in said filter and support frames.

12. The filter apparatus of claim 11 wherein said wall mount further comprises a screw attachment apparatus including screws disposed through apertures in said support frame and screwed into said wall.

13. The filter apparatus of claim 12 wherein the opening is a return at an end of a return duct disposed between two studs of said wall and said screws are screwed into said studs.

14. The filter apparatus of claim 10 wherein said securing lock comprises a pin slideably disposed through aligned apertures in said filter and support frames and said securing lock further comprises a pin retaining spring engaging said pin such that said pin is spring loaded within said aligned apertures.

15. The filter apparatus of claim 14 wherein said wall mount further comprises a screw attachment apparatus including screws disposed through apertures in said support frame and screwed into said wall.

16. The filter apparatus of claim 15 wherein the opening is a return at an end of a return duct disposed between two studs of said wall and said screws are screwed into said studs.

17. A filter apparatus for mounting over an opening at an end of a duct of a forced air system, said filter apparatus comprising:

a filter frame having sidewalls between an open front end and an open back end, said filter frame having a channel with channel wall elements extending generally perpendicular to and inwardly of said sidewalls such that said channel opens inwardly of said sidewalls, a single flat sheet of filter material behind a grill, both of which are peripherally disposed within said channel and are sized and sufficiently flexible so as to be removably insertable into said channel, and a wall mount means for mounting said filter frame on a wall over an opening.

18. The filter apparatus of claim 17, wherein said filter material is a self charging electrostatic washable material.

19. The filter apparatus of claim 18, further comprising a single flat second sheet of a second filter material disposed in said channel behind and directly in contact with said first sheet of filter material, said second filter material including activated charcoal.

* * * * *